United States Patent
Thompson et al.

(10) Patent No.: US 6,498,881 B1
(45) Date of Patent: Dec. 24, 2002

(54) IDENTIFICATION SCHEME TO BOTH IDENTIFY RIBBON COLOR/DASH CODE AND LOCATE FIBER#1

(75) Inventors: Justin Thompson, Huntersville, NC (US); Kevin Scott Paschal, Claremont, NC (US); Allen Griser, Hickory, NC (US); Curtis John Hutton, Hickory, NC (US); Rob Greer, Conover, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/538,286

(22) Filed: Mar. 29, 2000

(51) Int. Cl.7 ................................................ G02B 6/44
(52) U.S. Cl. ...................................................... 385/114
(58) Field of Search ......................................... 385/114

(56) References Cited

U.S. PATENT DOCUMENTS

| | | | |
|---|---|---|---|
| 2,992,292 A | | 7/1961 | Brown |
| 4,691,617 A | | 9/1987 | Purkott |
| 4,960,318 A | | 10/1990 | Nilsson et al. |
| 4,964,691 A | | 10/1990 | Nelson et al. |
| 5,166,998 A | | 11/1992 | Patel |
| 5,379,363 A | | 1/1995 | Bonicel et al. |
| 5,446,821 A | | 8/1995 | Nonaka et al. |
| 5,485,539 A | * | 1/1996 | Mills ............................. 347/4 |
| 5,796,905 A | | 8/1998 | Hoffart et al. |
| 5,809,195 A | | 9/1998 | Brown et al. |
| 6,370,304 B1 | * | 4/2002 | Mills ................. 385/114 |

* cited by examiner

Primary Examiner—Hung N. Ngo
(74) Attorney, Agent, or Firm—Sughrue Mion, PLLC (57) ABSTRACT

An optical fiber ribbon in which the location of a particular fiber contained in the ribbon can be easily identified in the field. The optical fiber ribbon includes a plurality of optical fibers arranged in parallel with and adjacent one another, and a ribbon matrix bonded to the outer coatings and encasing the plurality of optical fibers, wherein the ribbon matrix includes indicia on an outside thereof for directionally identifying a particular one of the optical fibers. According to a first aspect of the invention, the indicia includes triangle, with an apex of the triangle pointing in the direction of the particular fiber. Alternatively, according to a second aspect of the invention, the indicia includes an arrow pointing in the direction of the particular fiber. The indicia is preferably repeated at regular intervals along the length of the ribbon to allow the particular fiber to be identified along the entire length of the ribbon. In the case of an optical fiber ribbon product which includes a plurality of optical fiber ribbons, the indicia can also be used to distinguish between ribbons. For example, in the event the indicia is a triangle, a first optical fiber ribbon can be identified by a single triangle repeated at regular intervals along the length of the ribbon and a second optical fiber ribbon can be identified by a pair of triangles repeated along the length of the ribbon. Alternatively, the ribbons can be identified with a different indicia for distinguishing between the ribbons.

22 Claims, 6 Drawing Sheets

IDENTIFICATION SCHEME TO BOTH IDENTIFY RIBBON COLOR/DASH CODE AND LOCATE FIBER#1

BACKGROUND OF THE INVENTION

FIELD OF THE INVENTION

The present invention is directed to an optical fiber ribbon having indicia thereon to enable the user to identify a particular fiber (e.g., fiber no. 1) and also to distinguish one optical fiber ribbon from another.

BACKGROUND

Optical fiber ribbons consist of a planar array of optical fibers joined together by a resin matrix material or the like. Such ribbons are becoming increasingly popular where optical fibers are used for data transmission and the like. This is due, in part, to the fact that optical fiber ribbons may contain a relatively large number of optical fibers in a package that allows for easy handling and installation. Further, because optical fiber ribbons reduce the need for manipulating individual optical fibers, optical fiber maintenance procedures are simplified. Often, a single cable will include numerous optical fiber ribbons, stacked one on another or otherwise disposed in the cable.

It is desirable to be able to easily identify and distinguish optical fiber ribbons one from another and to distinguish constituent elements of a given optical fiber ribbon, both before and after the ribbons are installed in the field for use. Conventionally, ribbon identification has been accomplished by printing characters, such as words, on the ribbon surface or using ink jet printing methods or by applying a bar code to the ribbon, as disclosed in U.S. Pat. No. 5,809,195. Once the identifying characters have been printed on the ribbon (using ink jet methods or the like), the printed characters are susceptible to smearing. Such smearing may render the printed characters illegible. Even when the characters are not smeared, their small size makes it very difficult to read them, particularly in the field where lighting conditions tend to be poor. Also, matching particular printed characters (e.g., particular languages) to particular markets and/or customers can be a difficult and expensive task.

It is also known in the art to color-code optical fibers for the purpose of positively identifying individual fibers. Conventionally, a thermosetting ink layer, a UV-cured ink or varnish layer, or the like, is coated on the fiber to give it a particular color (see, e.g., U.S. Pat. Nos. 5,446,821 and 5,377,292, the disclosures of which are incorporated herein by reference). Alternatively, pigments or dyes or any other coloring agents can be directly mixed into the material used to coat the fiber as it is drawn from an optical fiber preform. Such methods eliminate the additional step required to apply the ink or varnish layer. Moreover, it is known to combine the processes of fiber coloring with ribbon manufacturing.

More specifically, conventional optical fiber cables include optical fiber ribbons that are grouped together in sets (with each set having one or more, e.g., twelve, optical fibers) with each fiber in a particular set having a unique color. Thus, within a single ribbon, the optical fibers are coated with distinctly different colors. These distinct colors are repetitively used for each ribbon, so that if there are three ribbons, the optical fiber cable will have, e.g., three red optical fibers, three green optical fibers, etc. In order to distinguish between optical fibers having the same color, it is necessary to code each ribbon. This has been accomplished by applying varying numbers of marks (e.g., ink rings) to the ribbons, as disclosed in U.S. Pat. No. 5,379,363. None of the prior art addresses identifying fiber no. 1.

SUMMARY OF THE INVENTION

It is an object of the present invention to overcome the drawbacks of the prior art. More particularly, it is an object of the present invention to provide an optical fiber ribbon in which the location of a particular fiber contained in the ribbon can be easily identified in the field.

It is a further object of the present invention to use a common indicia for both identifying the particular fiber of each ribbon and to distinguish the ribbons from each other.

The present invention achieves the above and other objects and advantages by an optical fiber ribbon including a plurality of optical fibers, having outer coatings, arranged in parallel with and adjacent one another, and a ribbon matrix bonded to the outer coatings and encasing the plurality of optical fibers, wherein the ribbon matrix includes indicia on an outside thereof for directionally identifying a particular one of the optical fibers. According to a first aspect of the invention, the indicia includes triangle, with an apex of the triangle pointing in the direction of the particular fiber. Alternatively, according to a second aspect of the invention, the indicia includes an arrow, or any other geometrical shape that can be used to convey emphasis in a particular direction, pointing in the direction of the particular fiber. The indicia is preferably repeated at regular intervals along the length of the ribbon to allow the particular fiber to be identified along the entire length of the ribbon.

The invention is also directed to an optical fiber ribbon cable which includes a plurality of optical fiber ribbons. In this case, the indicia can also be used to distinguish between ribbons. For example, in the case where the indicia is a triangle, a first optical fiber ribbon can be identified by a single triangle repeated at regular intervals along the length of the ribbon and a second optical fiber ribbon can be identified by a pair of triangles repeated along the length of the ribbon. Alternatively, the ribbons can be identified with a different indicia for distinguishing between the ribbons. For example, the first ribbon can be identified by a single stripe extending between the triangles and the second ribbon can be identified by a pair of stripes extending between the pairs of triangles. Alternatively, the ribbon matrix material for each ribbon can have different colors as a way to distinguish one ribbon from another. Alternatively, the indicia used may itself be colored such that the color may vary from one ribbon to the next. For example, the first ribbon may be identified by a white triangle and the second ribbon may be identified by a blue triangle. It is also within the scope of the invention to include any possible combination of multiple embodiments within a cable, or grouping of ribbons, thus allowing for an increase in the number of ribbons, each with an independent indicia, possible.

DETAILED DESCRIPTION OF THE INVENTION

Throughout the drawings and description of the present invention, like reference numerals will be used to designate like elements. Furthermore, while certain optical fiber ribbon examples are shown, it will be appreciated that the concepts of the present invention are applicable to many other sizes, shapes and structures, etc., of optical fiber ribbons presently available in the industry or designed in the future.

Figure 1:
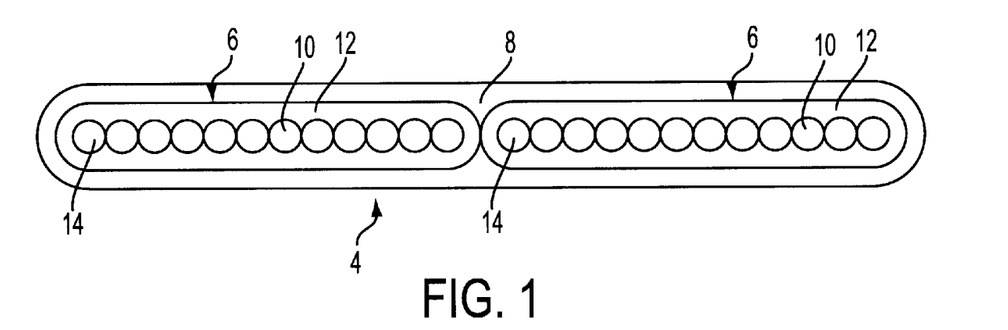
FIG. 1 is a perspective view of an optical fiber ribbon according to a first aspect of the present invention.
Figure 2:
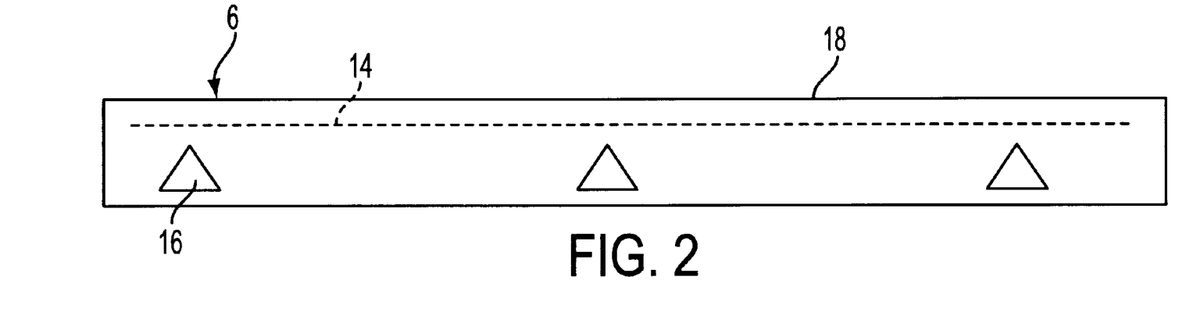
FIG. 2 is a diagrammatic plan view of the optical fiber ribbon of FIG. 1.

A first embodiment of the present invention will now be described with reference to FIGS. 1 and 2. FIG. 1 is a perspective view of an optical fiber splittable ribbon (or ribbon product) 4 including a plurality of optical fiber ribbons 6 arranged side-by-side and surrounded by a sheath 8. Each optical fiber ribbon 6 includes a number (e.g., twelve) of parallel optical fibers 10 embedded in a ribbon matrix 12. A standard 12-fiber ribbon is shown, but this description applies to all ribbons of various fiber counts. The optical fiber ribbon 6 may be used in a splittable ribbon 4, or used alone and packaged in a cable as an independent unit. FIG. 2 is a diagrammatic view showing one of the optical fiber ribbons 6 for the purpose of illustrating the invention.

Generally, the individual fibers 10 are sequentially identified by numbers 1 through n, where n corresponds to the total number of fibers in a particular ribbon. It is important for persons in the field to at least be able to identify fiber no. 1 (or the first optical fiber), identified in FIGS. 1 and 2 (by the dashed line) by reference numeral 14, after which the remaining fibers could be identified since they are sequentially numbered.

According to the present invention, a symbol 16, such as a triangle, is intermittently printed on the outer surface of each of the optical fiber ribbons 6 as a means of directionally identifying the location of the first optical fiber 14. In particular, with reference to FIG. 2, the triangles 16 point toward the top edge 18 of the ribbon 6 from which it can be determined that the uppermost fiber 14 running along this edge corresponds to fiber no. 1, with the remaining fibers being sequentially arranged in numerical order. The advantage of this arrangement is that the triangle is relatively large so that it can be easily detected. Hence, a person working in the field can easily identify fiber no. 1. The other fibers may have a corresponding identification scheme.

Figure 3:
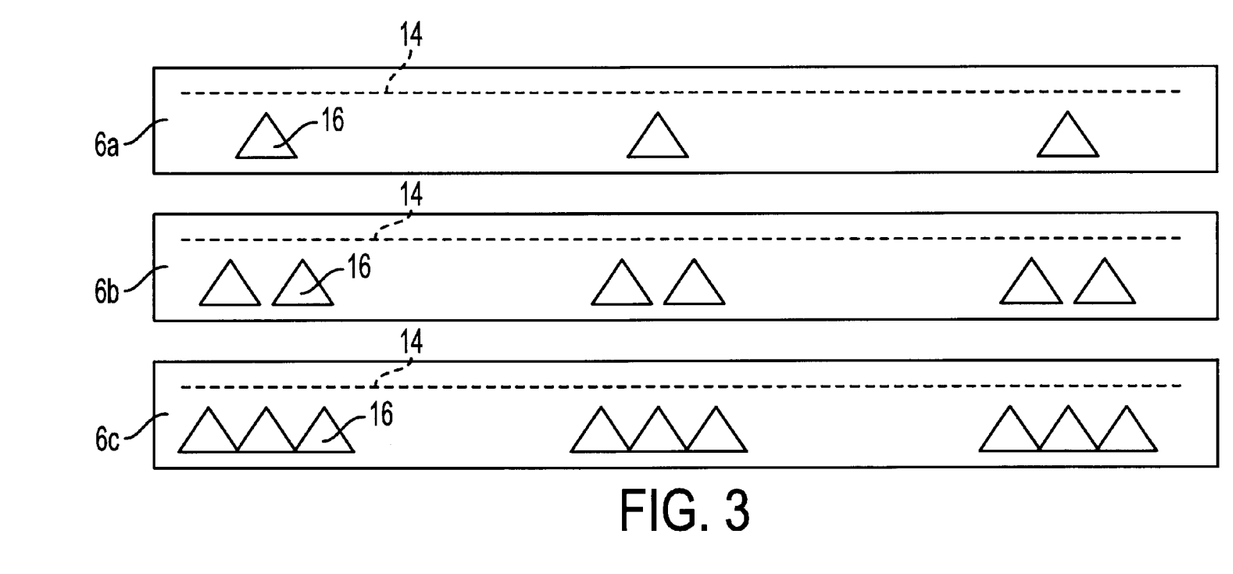
FIG. 3 is a diagrammatic plan view of a plurality of optical fiber ribbons according to a second aspect of the invention.

According to a second aspect of the invention, this same indicia (e.g., the triangle) can also be used to distinguish between the optical fiber ribbons 6 which make up the optical fiber ribbon product. FIG. 3 is a diagrammatic view showing the individual ribbons 6a, 6b and 6c. As shown in FIG. 3, there is provided three optical fiber ribbons each having a series of triangles 16 printed on its outer surface. The first ribbon 6a has a single triangle 16 repeated at regular intervals to identify the ribbon as, for example, ribbon no. 1; the second 6b has a pair of triangles 16 repeated at regular intervals to identify the ribbon as ribbon no. 2; and the third ribbon 6c has three triangles 16 repeated at regular intervals to identify the ribbon as ribbon no. 3. Thus, the triangles 16 serve to identify the individual ribbons 6a, 6b and 6c as well as the first optical fiber 14 for each of the ribbons.

Figure 4:
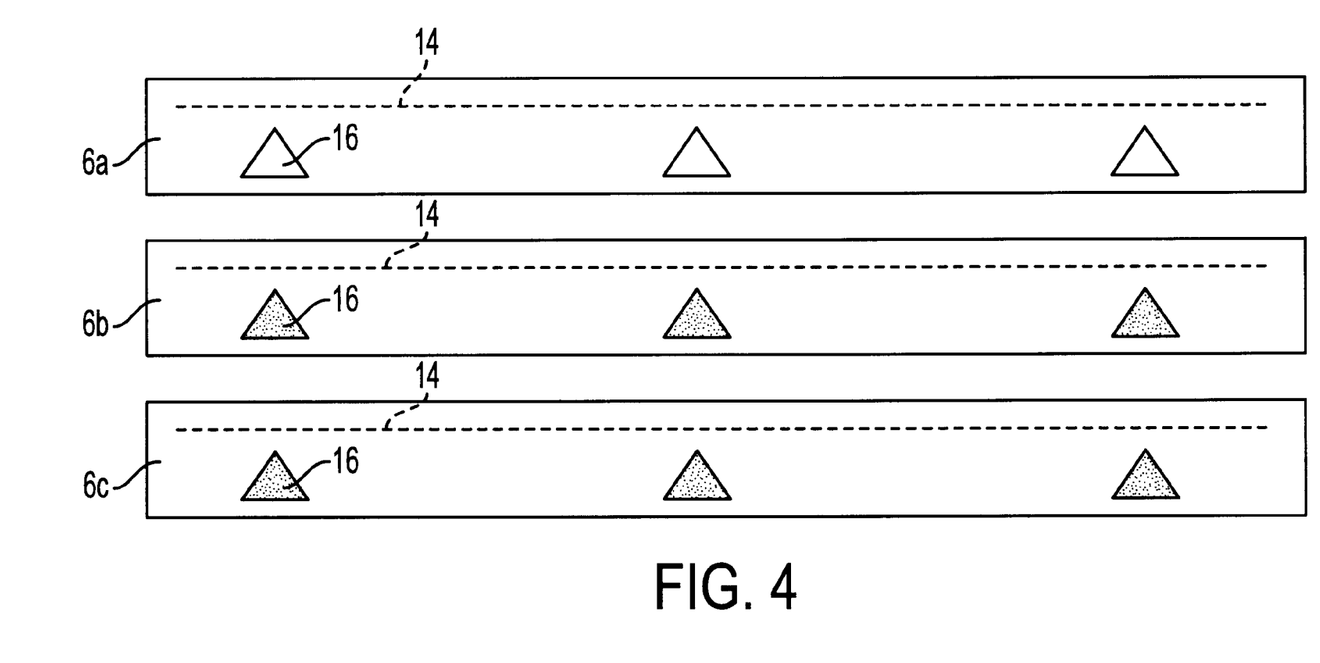
FIG. 4 is a diagrammatic plan view of a plurality of optical fiber ribbons according to a third aspect of the invention.

Another possibility is to provide a single intermittent triangle 16 on each ribbon to identify fiber no. 1, where the triangles have different colors to identify the different ribbons, as shown in FIG. 4. Specifically, the first ribbon 6a is identified by white triangles, the second ribbon 6b by blue triangles and the third ribbon 6c by red triangles. Further, neon, fluorescent or luminescent colors could be provided to improve their visibility. The colors white, blue and red are mentioned as examples. Any color(s) may be used without departing form the scope of the invention.

Figure 5:
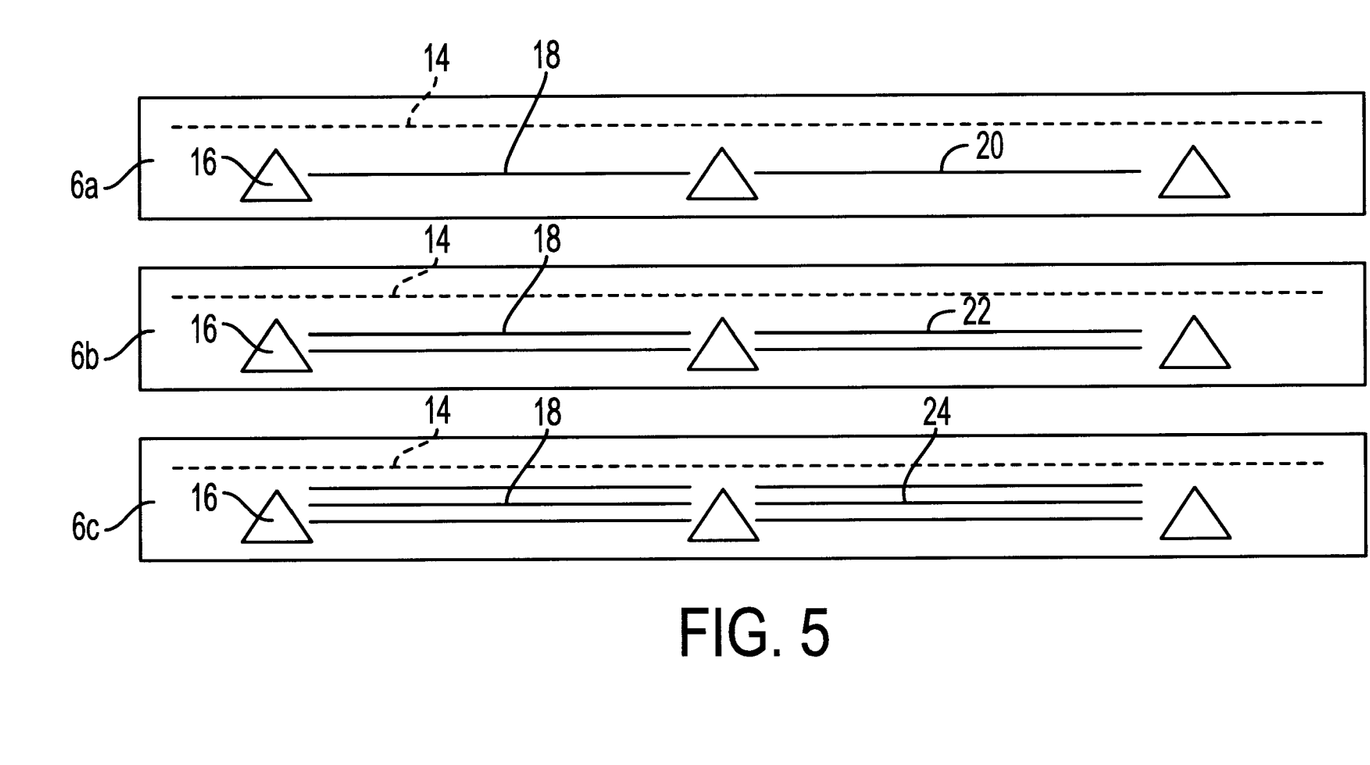
FIG. 5 is a diagrammatic plan view of a plurality of optical fiber ribbons according to a fourth aspect of the invention.

FIG. 5 illustrates a further embodiment of the invention. In this embodiment, intermittent triangles 16 are used to identify ribbon no. 1 for each of the ribbons, as in the first embodiment. However, in this embodiment, the various ribbons 6a, 6b and 6c are distinguished from each other by providing another indicia 18 on the outside surface of the ribbons, between the triangles. In this illustrated example, the additional indicia 18 corresponds to one or more stripes extending longitudinally along the ribbons, with the first ribbon 6a being identified with a single stripe 20; the second ribbon 6b being identified by a pair of parallel stripes 22; and the third ribbon 6c being identified by three parallel stripes 24. Alternatively, the first ribbon 6a could be devoid of any stripes, the second ribbon 6b could include a single stripe, and the third ribbon 6c could include two stripes, etc.

Figure 6:
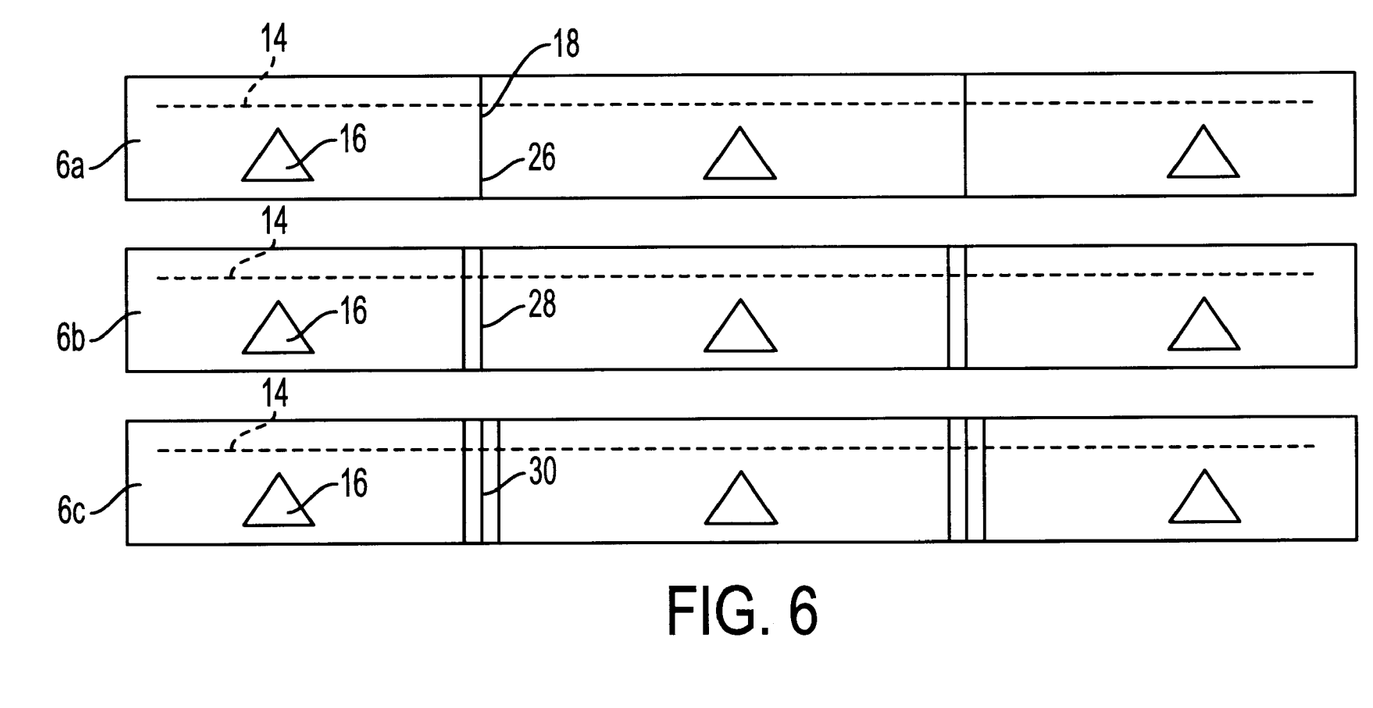
FIG. 6 is a diagrammatic plan view of a plurality of optical fiber ribbons according to a fifth aspect of the present invention.

FIG. 6 diagrammatically illustrates a further embodiment of the present invention. This embodiment 6 differs from the embodiment of FIG. 4, by arranging the stripes 18 in the transverse direction (i.e., transverse to the longitudinal axis of the ribbons). Here, the first ribbon 6a is identified by a single transverse stripe 26, the second ribbon 6b by a pair of transverse stripes 28 and the third ribbon 6c by three transverse stripes 30.

Yet another alternative is to combine the above features when there are a large number of ribbons, e.g., more than three. For example, with reference to FIG. 7, the optical fiber ribbon unit 4 includes four ribbons 6a, 6b, 6c and 6d. According to this embodiment, the first ribbon 6a is identified as such with single intermittent triangles 16; the second ribbon 6b with a single intermittent triangle 16 and a single stripe 20 in between the triangles; the third ribbon 6c with a pair of intermittent triangles 16; the fourth ribbon 6d with two triangles and two stripes 24, etc.

Figure 7:
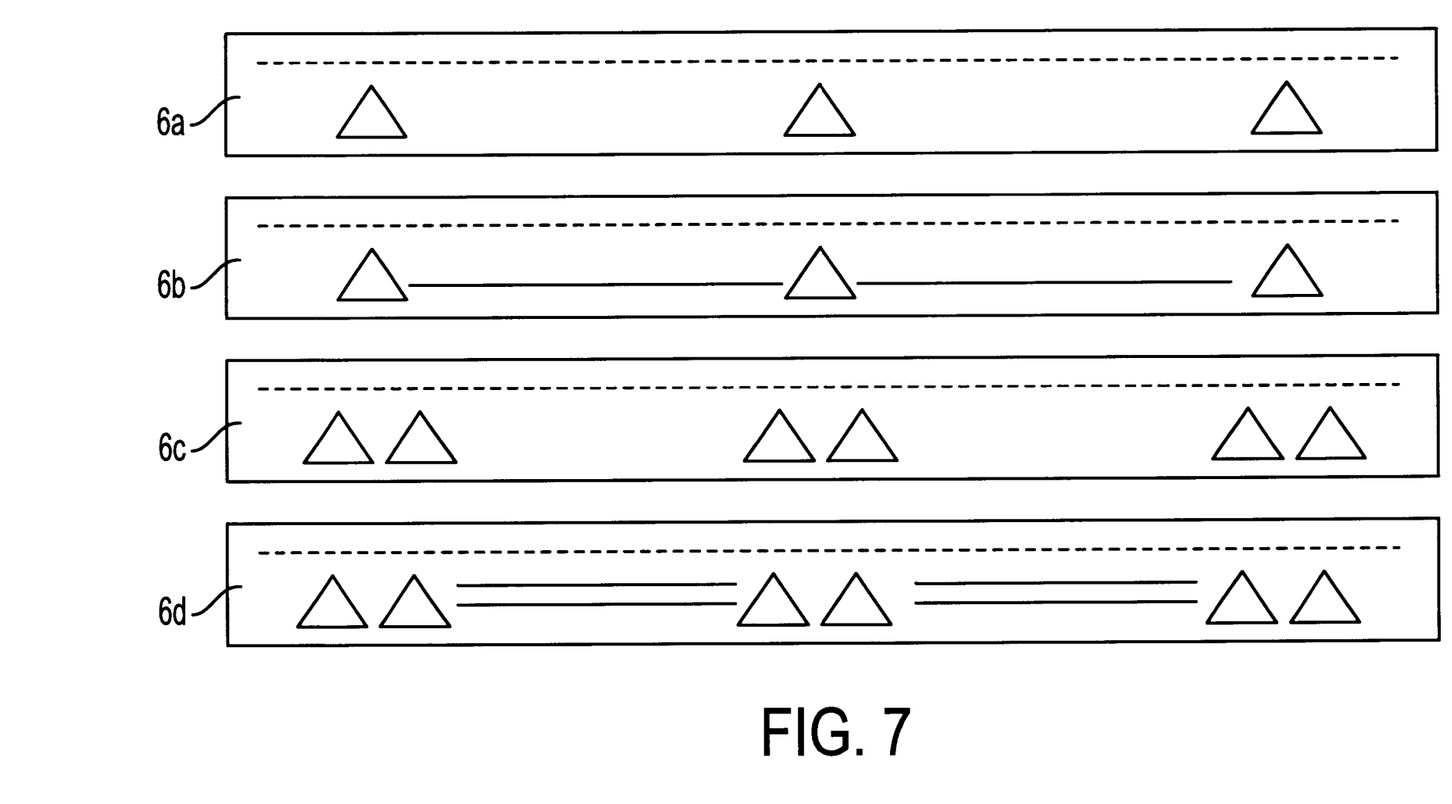
FIG. 7 is a diagrammatic plan view of a plurality of optical fiber ribbons according to a sixth aspect of the present invention.

Accordingly, in this embodiment, the triangles function as a means for identifying the first optical fiber 14 and for assisting in identifying the individual ribbons, in conjunction with the additional indicia 18 (i.e., the stripes).

A further alternative is to use the triangles to identify the location of fiber no. 1 and to color the matrix material 12 of the various ribbons with different colors for identification purposes, as a substitute for the stripes 18. Alternatively, the matrix material 12 can be a uniform color (or colorless) with each ribbon 6a, 6b, 6c being identified by printing the name of the color (e.g., ribbon no. 1 with "red", ribbon no. 2 with "blue", etc.), although this technique is not the preferred technique due to the difficulties discussed above with reading the letters in the field.

Naturally, the present invention is not limited to using triangles to identify a particular fiber (e.g., the first optical fiber 14). For example, other alternatives include arrows, or, for example, the symbol "V" so long as it is understood that the particular indicia used directionally identifies the location of fiber no. 1.

While the present invention has been described with respect to what is presently considered to be the preferred embodiments, the present invention is not limited to the disclosed embodiments. Rather the present invention covers various modifications and equivalent arrangements included within the spirit and scope of the appended claims. The scope of the appended claims is to be accorded the broadest interpretation so as to encompass all such modifications and equivalent structures and functions.

What is claimed is:

1. An optical fiber ribbon, comprising:
   a plurality of optical fibers arranged in parallel with and adjacent one another, and a ribbon matrix encasing said plurality of optical fibers, wherein said ribbon matrix includes indicia on an outside thereof for identifying a particular one of said optical fibers, wherein said indicia directionally identifies said particular fiber.

2. The optical fiber ribbon of claim 1, wherein said indicia includes a triangle, with an apex of said triangle pointing in the direction of said particular fiber.

3. The optical fiber ribbon of claim 1, wherein said indicia includes an arrow pointing in the direction of said particular fiber.

4. An optical fiber ribbon, comprising:
   a plurality of optical fibers arranged in parallel with and adjacent one another, and a ribbon matrix encasing said plurality of optical fibers, wherein said ribbon matrix includes indicia on an outside thereof for identifying a particular one of said optical fibers, wherein said indicia is repeated at regular intervals along the length of said optical fiber ribbon.

5. An optical fiber ribbon, comprising:
   a plurality of optical fibers arranged in parallel with and adjacent one another, and a ribbon matrix encasing said plurality of optical fibers, wherein said ribbon matrix includes indicia on an outside thereof for identifying a particular one of said optical fibers, wherein said indicia includes a plurality of marks.

6. The optical fiber ribbon of claim 5, where said plurality of marks includes a plurality of triangles.

7. An optical fiber ribbon, comprising:
   a plurality of optical fibers arranged in parallel with and adjacent one another, and a ribbon matrix encasing said plurality of optical fibers, wherein said ribbon matrix includes indicia on an outside thereof for identifying a particular one of said optical fibers, wherein said indicia is of a particular color, such that a difference in said color can be used to differentiate between ribbons with similar indicia.

8. An optical fiber ribbon product, comprising:
   a plurality of optical fiber ribbons, each of said ribbons including:
      a plurality of optical fibers arranged in parallel with and adjacent one another, and
      a ribbon matrix encasing said plurality of optical fibers, wherein said ribbon matrix includes indicia on an outside thereof for identifying a particular one of said optical fibers, wherein said indicia directionally identifies said particular fiber.

9. The optical fiber ribbon product of claim 8, wherein said indicia includes a triangle, with an apex of said triangle pointing in the direction of said particular fiber.

10. The optical fiber ribbon product of claim 8, wherein said indicia includes an arrow pointing in the direction of said particular fiber.

11. An optical fiber ribbon product, comprising:
    a plurality of optical fiber ribbons, each of said ribbons including:
       a plurality of optical fibers arranged in parallel with and adjacent one another, and
       a ribbon matrix encasing said plurality of optical fibers, wherein said ribbon matrix includes indicia on an outside thereof for identifying a particular one of said optical fibers, wherein said indicia is repeated at regular intervals along the length of said ribbon.

12. An optical fiber ribbon product, comprising:
    a plurality of optical fiber ribbons, each of said ribbons including:
       a plurality of optical fibers arranged in parallel with and adjacent one another, and
       a ribbon matrix encasing said plurality of optical fibers, wherein said ribbon matrix includes indicia on an outside thereof for identifying a particular one of said optical fibers, wherein said indicia includes a plurality of marks.

13. The optical fiber ribbon product of claim 12, where said plurality of marks includes a plurality of triangles.

14. An optical fiber ribbon product, comprising:
    a plurality of optical fiber ribbons, each of said ribbons including:
       a plurality of optical fibers arranged in parallel with and adjacent one another, and
       a ribbon matrix encasing said plurality of optical fibers, wherein said ribbon matrix includes indicia on an outside thereof for identifying a particular one of said optical fibers, wherein said indicia is different for each of said plurality of ribbons such that said indicia distinguishes a first one of said ribbons from a second one of said ribbons.

15. The optical fiber ribbon product of claim 14, where said indicia for said first ribbon include a single mark, and said indicia for said second ribbon includes a plurality of marks.

16. The optical fiber ribbon product of claim 15, wherein said single mark is a triangle repeated at regularly spaced intervals along the length of said first ribbon and said plurality of marks is a plurality of triangles repeated at regularly spaced intervals along the length of said second ribbon.

17. The optical fiber ribbon product of claim 14, where said indicia for said first ribbon includes a particular color, and said indicia for said second ribbon includes a different particular color.

18. An optical fiber ribbon product, comprising:
    a plurality of optical fiber ribbons, each of said ribbons including:
       a plurality of optical fibers arranged in parallel with and adjacent one another, and
       a ribbon matrix encasing said plurality of optical fibers, wherein said ribbon matrix includes indicia on an outside thereof for identifying a particular one of said optical fibers, wherein said ribbon matrix further includes another indicia for distinguishing a first of said optical fiber ribbons from a second of said optical fiber ribbons.

19. The optical fiber ribbon product of claim 18, wherein said another indicia includes stripes with said second optical fiber ribbon having a different number of stripes than said first optical fiber ribbon.

20. The optical fiber ribbon product of claim 18, wherein said another indicia includes coloring said ribbon matrix differently.

21. An optical fiber ribbon, comprising:
  a plurality of optical fibers arranged in parallel with and adjacent one another, and a ribbon matrix encasing said plurality of optical fibers, wherein said ribbon matrix includes indicia means for identifying a particular one of said optical fibers.

22. An optical fiber ribbon product, comprising:
  a plurality of optical fiber ribbons, each of said ribbons including:
    a plurality of optical fibers arranged in parallel with and adjacent one another, and
  a ribbon matrix encasing said plurality of optical fibers, wherein said ribbon matrix includes indicia means for identifying a particular one of said optical fibers.

* * * * *